US010703856B2

(12) United States Patent
Kobatake

(10) Patent No.: US 10,703,856 B2
(45) Date of Patent: Jul. 7, 2020

(54) EPOXY RESIN COMPOSITION AND CURED PRODUCT OF SAME

(71) Applicant: DAICEL CORPORATION, Osaka-shi, Osaka (JP)

(72) Inventor: Takanori Kobatake, Ohtake (JP)

(73) Assignee: DAICEL CORPORATION, Osaka-Shi (JP)

( * ) Notice: Subject to any disclaimer, the term of this patent is extended or adjusted under 35 U.S.C. 154(b) by 60 days.

(21) Appl. No.: 15/312,339

(22) PCT Filed: May 19, 2015

(86) PCT No.: PCT/JP2015/064317
§ 371 (c)(1),
(2) Date: Nov. 18, 2016

(87) PCT Pub. No.: WO2015/178373
PCT Pub. Date: Nov. 26, 2015

(65) Prior Publication Data
US 2017/0096522 A1 Apr. 6, 2017

(30) Foreign Application Priority Data

May 20, 2014 (JP) ................................. 2014-104271

(51) Int. Cl.
| C08L 63/00 | (2006.01) |
| C08G 59/62 | (2006.01) |
| C08G 59/72 | (2006.01) |
| C08K 3/36 | (2006.01) |
| C08K 5/524 | (2006.01) |
| C08L 67/04 | (2006.01) |
| C08K 5/00 | (2006.01) |
| C08G 59/24 | (2006.01) |
| C08K 5/527 | (2006.01) |
| C08J 9/32 | (2006.01) |
| C08K 7/28 | (2006.01) |

(52) U.S. Cl.
CPC ............ *C08G 59/62* (2013.01); *C08G 59/24* (2013.01); *C08G 59/72* (2013.01); *C08K 3/36* (2013.01); *C08K 5/005* (2013.01); *C08K 5/524* (2013.01); *C08K 5/527* (2013.01); *C08L 63/00* (2013.01); *C08L 67/04* (2013.01); *C08J 9/32* (2013.01); *C08J 2201/026* (2013.01); *C08J 2203/22* (2013.01); *C08J 2363/00* (2013.01); *C08K 7/28* (2013.01)

(58) Field of Classification Search
CPC .............................. C08G 59/72; C08G 59/626
See application file for complete search history.

(56) References Cited

U.S. PATENT DOCUMENTS

| 3,379,653 A * | 4/1968 | Ernst .................. C08G 59/4078 528/421 |
| 4,294,746 A * | 10/1981 | Blair ...................... C08G 18/58 523/461 |
| 5,514,729 A * | 5/1996 | Diamant .................. H01B 1/22 252/501.1 |
| 5,539,023 A * | 7/1996 | Dreischhoff .......... C04B 24/281 523/404 |
| 5,731,369 A * | 3/1998 | Mahoney ............... C08G 59/62 427/137 |
| 5,959,061 A * | 9/1999 | Neumann ............... C08G 59/04 523/414 |
| 2011/0195195 A1* | 8/2011 | Geisberger ........... C08G 59/184 427/427.5 |
| 2013/0131216 A1* | 5/2013 | Sakane .................. H01L 23/293 523/451 |
| 2013/0241086 A1* | 9/2013 | Sakane .................... C08K 3/36 257/788 |
| 2015/0148451 A1* | 5/2015 | Harada .................. C08G 59/72 523/434 |
| 2015/0284562 A1* | 10/2015 | Feng ....................... C08L 63/00 523/427 |

FOREIGN PATENT DOCUMENTS

| EP | 2612884 A1 | 7/2013 |
| JP | 59-11317 A | 1/1984 |
| JP | 5-78639 A | 3/1993 |
| JP | 11-30114 A | 11/1999 |
| JP | 2001-39063 A | 2/2001 |
| JP | 2003-238770 A | 8/2003 |
| JP | 2007-308683 A | 11/2007 |
| JP | 2011-148912 A | 8/2011 |
| JP | 2012-1689 A | 1/2012 |

(Continued)

OTHER PUBLICATIONS

Machine translation of JP 2011-148912. (Year: 2011).*
Machine translation of JP 59-011317. (Year: 1984).*
Derwent translation of JP 59-011317. (Year: 1984).*
Machine translation of JP 2010-065183 by Murayama et al (Year: 2010).*
"Catalytic curing agents" by Atchekzai, J.; Bonnetot, B.; France, B.; Mongeot, H.; Anton, A.; Dubuisson, A.; Chastanger, P. Polymer Bulletin 27, 47-52. (Year: 1991).*
Kultzow et al. "Cycloaliphatic Epoxy Resins" Huntsman Advanced Materials, 2007, 6 pages. (Year: 2007).*

(Continued)

*Primary Examiner* — Robert S Loewe
(74) *Attorney, Agent, or Firm* — Birch, Stewart, Kolasch & Birch, LLP

(57) ABSTRACT

The present invention relates to an epoxy resin composition containing an alicyclic epoxy compound (A), a polymer polyol having two or more terminal hydroxyl groups (B), and a Lewis acid-amine complex (C). The present invention provides an epoxy resin composition which can be cured by heating at low temperatures, and suppresses heat generation associated with curing (heat generation by curing). It is preferable that the epoxy resin composition further contains an antioxidant. Furthermore, it is preferable that the antioxidant is a phosphite ester compound.

14 Claims, 2 Drawing Sheets

(56) References Cited

FOREIGN PATENT DOCUMENTS

WO     WO-2012029425 A1 *   3/2012   ........... H01L 23/293
WO     WO-2013183667 A1 *   12/2013   ............. C08G 59/72

OTHER PUBLICATIONS

Three Bond Technical News "Curing Agents for Epoxy Resin" 1990, 10 pages. (Year: 1990).*
International Search Report, issued in PCT/JP2015/064317, dated Jul. 28, 2015.
Written Opinion of the International Searching Authority (PCT/ISA/237), issued in PCT/JP2015/064317, dated Jul. 28, 2015.

* cited by examiner

EPOXY RESIN COMPOSITION AND CURED PRODUCT OF SAME

TECHNICAL FIELD

The present invention relates to an epoxy resin composition and/or a cured product of the same, and particularly relates to an epoxy resin composition which can be preferably used as a resin composition for forming a syntactic foam, and a cured product of the same.

BACKGROUND ART

An epoxy resin composition containing an epoxy resin and an epoxy compound (these are sometimes generically referred to as an "epoxy compound") can be converted to a lightweight cured product having high strength by curing the epoxy resin composition. Therefore, the epoxy resin composition is widely used as materials for constituting products and parts or the like in various fields. In recent years, for example, there is an attempt to use the epoxy resin composition as a material for forming a syntactic foam (e.g., see Patent Literature 1). The syntactic foam is a structure where microballoons (minute hollow spherical bodies) are dispersed in a matrix resin (polymer matrix). Taking advantage of light weight and high strength characteristics, the syntactic foam is used as a buoyant body of a deep ocean research vehicle, or the like.

CITATION LIST

Patent Literature

Patent Literature 1: Japanese Patent Laid-Open No. 2011-148912

SUMMARY OF INVENTION

Technical Problem

In order to obtain a molded body (cured product) having a desired shape using an epoxy resin composition, there is generally adopted a method including filling a mold or a container or the like with an epoxy resin composition and curing the epoxy resin composition by heating, for example. In this case, from the viewpoints of energy saving and productivity, and from the viewpoint of suppressing the heat deterioration of the mold or container, it is advantageous to curing the epoxy resin composition by heating at as low temperatures as possible.

Furthermore, when a large-sized molded body is manufactured, heat generated by the curing reaction of an epoxy resin composition is desirably as small as possible. When the heat generation associated with the curing reaction is increased, the internal temperature of the epoxy resin composition or cured product is extremely increased, which makes it difficult to control a process for performing the curing reaction. When heat exceeding the heat resistance of the mold or container or the like is generated, the heat sometimes adversely affects the durability of the mold or container.

Importance is particularly attached to the characteristics of the curability at low temperatures and small heat generation associated with the curing reaction when the epoxy resin composition is used as a material for forming the above-mentioned syntactic foam. The syntactic foam is often used as a structure with which a container (e.g., a polyethylene container) is filled. When a curing reaction is performed in such a container, it is important that the epoxy resin composition can be cured at low temperatures that the container can resist. Because the syntactic foam used as a buoyancy material or the like is large-sized, heat is apt to be stored in the syntactic foam during curing, which makes it very difficult to prevent the runaway of the curing reaction and to suppress the rapid increase in the internal temperature at present.

In order to efficiently fill the mold or the container with the epoxy resin composition and to reflect the shape of the mold or container to the molded body to be obtained, with sufficient accuracy, the epoxy resin composition advantageously has a low viscosity.

Therefore, it is an object of the present invention to provide an epoxy resin composition which can be cured by heating at low temperatures, and suppresses heat generation associated with curing (heat generation by curing), and a cured product of the same.

It is another object of the present invention to provide an epoxy resin composition which has a low viscosity to provide easy handling, can be cured by heating at low temperatures, and suppresses heat generation associated with curing (heat generation by curing), and a cured product of the same.

Solution to Problem

After intensive investigations to solve the problems, the present inventors have found that an epoxy resin composition containing an alicyclic epoxy compound, a polymer polyol having two or more terminal hydroxyl groups, and a Lewis acid-amine complex as essential components can be cured by heating at low temperatures, suppresses heat generation by curing, and can be particularly preferably used as a resin composition for forming a syntactic foam. The present invention has been completed based on these findings.

That is, the present invention provides an epoxy resin composition containing: an alicyclic epoxy compound (A); a polymer polyol having two or more terminal hydroxyl groups (B); and a Lewis acid-amine complex (C).

The present invention provides the epoxy resin composition further containing an antioxidant.

Furthermore, the present invention provides the epoxy resin composition, wherein the antioxidant is a phosphite ester compound.

Furthermore, the present invention provides the epoxy resin composition,
wherein:
the phosphite ester compound is at least one selected from the group consisting of a compound represented by the following formula (I):

[Formula 1]

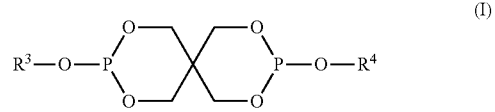

wherein $R^3$ and $R^4$ are the same or different and represent a substituted or unsubstituted hydrocarbon group, and a compound represented by the following formula (II):

[Formula 2]

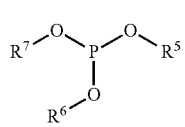

(II)

wherein $R^5$, $R^6$, and $R^7$ are the same or different and represent a substituted or unsubstituted hydrocarbon group.

The present invention provides the epoxy resin composition further containing at least one selected from the group consisting of a silica filler and glass bubble.

The present invention provides a cured product of the epoxy resin composition.

Furthermore, the present invention provides the epoxy resin composition, wherein the epoxy resin composition is a resin composition for forming a syntactic foam.

The present invention provides a syntactic foam containing: a cured product of the epoxy resin composition; and microballoons dispersed in the cured product.

That is, the present invention relates to the following.

[1] An epoxy resin composition containing: an alicyclic epoxy compound (A); a polymer polyol having two or more terminal hydroxyl groups (B); and a Lewis acid-amine complex (C).

[2] The epoxy resin composition according to [1], wherein the alicyclic epoxy compound (A) is a compound represented by the following formula (1).

[Formula 3]

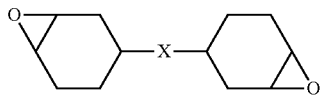

(1)

In the formula (1), X represents a single bond or a linking group (a divalent group having one or more atoms).

[3] The epoxy resin composition according to [2], wherein the compound represented by the formula (1) is at least one selected from the group consisting of compounds represented by the following formulae (1-1) to (1-10).

[Formula 4]

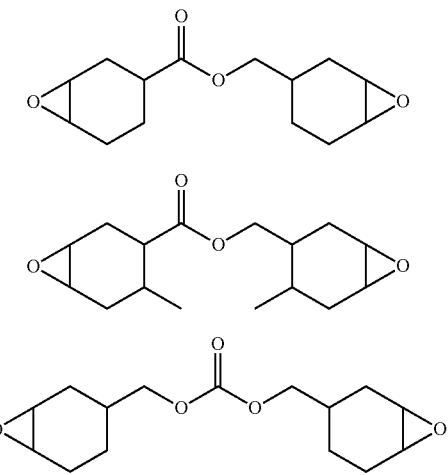

(1-1)

(1-2)

(1-3)

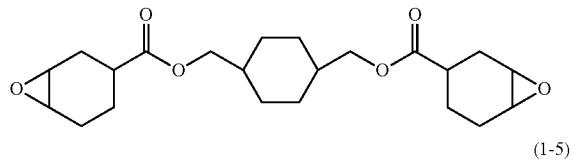

(1-4)

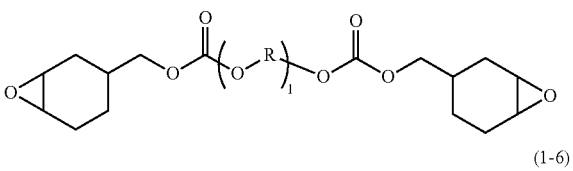

(1-5)

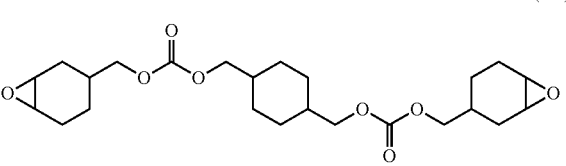

(1-6)

(1-7)

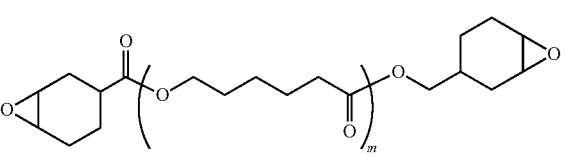

(1-8)

[Formula 5]

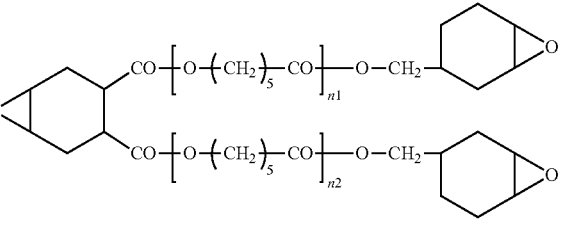

(1-9)

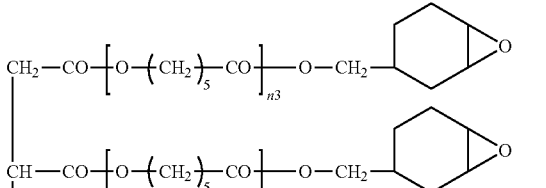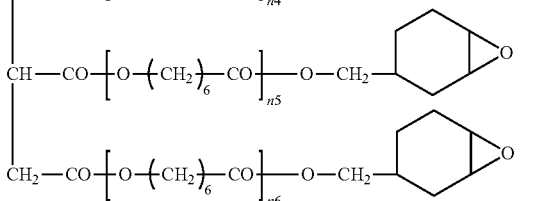

(1-10)

In the formulae, "l" and "m" each represent an integer of 1 to 30; R represents an alkylene group having 1 to 8 carbon atoms; and n1 to n6 each represent an integer of 1 to 30.

[4] The epoxy resin composition according to [1], wherein the alicyclic epoxy compound (A) is a compound represented by the following formula (2).

[Formula 6]

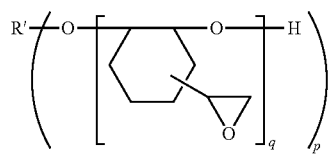

(2)

In the formula (2), R' represents a group (p-hydric organic group) formed by removing a number "p" of hydroxy groups (—OH) from the structural formula of a p-hydric alcohol; and "p" and "q" each represent a natural number.

[5] The epoxy resin composition according to any one of [1] to [4], wherein the epoxy resin composition contains 30 to 98% by weight of the alicyclic epoxy compound (A) based on the total amount (100% by weight) of the epoxy resin composition.

[6] The epoxy resin composition according to any one of [1] to [5], wherein a ratio of the alicyclic epoxy compound (A) to the total amount (100% by weight) of an epoxy compound (compound having an epoxy group) contained in the epoxy resin composition is not less than 50% by weight.

[7] The epoxy resin composition according to any one of [1] to [6], wherein a hydroxy value of the polymer polyol (B) is 10 to 800 mgKOH/g.

[8] The epoxy resin composition according to any one of [1] to [7], wherein a viscosity of the polymer polyol (B) at 25° C. is 100 to 25000 mPa·s.

[9] The epoxy resin composition according to any one of [1] to [8], wherein a number average molecular weight of the polymer polyol (B) is 200 to 10000.

[10] The epoxy resin composition according to any one of [1] to [9], wherein the polymer polyol (B) is a polyester polyol having an oligoester or a polyester skeleton per molecule, and having two or more terminal hydroxyl groups per molecule.

[11] The epoxy resin composition according to [10], wherein the polymer polyol (B) is a compound having two or more terminal hydroxyl groups per molecule, and having, per molecule, at least a structure unit [—C(O)—R$^L$—O—] (R$^L$ represents an alkylene-group) which is formed by subjecting a lactone (lactones) to a ring-opening addition reaction (including also ring-opening addition polymerization).

[12] The epoxy resin composition according to [11], wherein the polymer polyol (B) is a compound having two or more terminal hydroxyl groups per molecule, and having, per molecule, at least a structure unit [—C(O)—(CH$_2$)$_5$—O—] which is formed by subjecting e-caprolactone to a ring-opening addition reaction (including also ring-opening addition polymerization).

[13] The epoxy resin composition according to [10], wherein the polymer polyol (B) is a lactone adduct compound represented by the following formula (3).

[Formula 7]

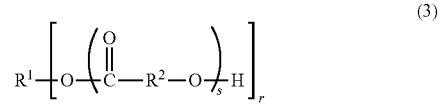

(3)

In the formula (3), "r" represents an integer of 1 to 20; R$^1$ represents an organic group (organic residue) formed by removing a number "r" of hydroxy groups from the structural formula [R$^1$(OH)$_r$] of a compound having a number "r" of hydroxy groups per molecule; "s" means the number of repetition of structures (lactone units) in a bracket with "s", and represents an integer of 0 to 10; the total number of "s" in the formula (3) is an integer of 1 or more; and R$^2$ represents an alkylene group.

[14] The epoxy resin composition according to any one of [1] to [13], wherein the epoxy resin composition contains 1 to 70 parts by weight of the polymer polyol (B) based on 100 parts by weight of the alicyclic epoxy compound (A).

[15] The epoxy resin composition according to any one of [1] to [14], wherein the epoxy resin composition contains 50 to 2000 parts by weight of the polymer polyol (B) based 100 parts by weight of the Lewis acid-amine complex (C).

[16] The epoxy resin composition according to any one of [1] to [15], wherein a Lewis acid constituting the Lewis acid-amine complex (C) is a boron halide compound.

[17] The epoxy resin composition according to any one of [1] to [16], wherein an amine constituting the Lewis acid-amine complex (C) is an aliphatic amine.

[18] The epoxy resin composition according to any one of [1] to [17], wherein the Lewis acid-amine complex (C) is an amine complex of boron trifluoride (particularly, an aliphatic amine complex of boron trifluoride).

[19] The epoxy resin composition according to any one of [1] to [18], wherein the epoxy resin composition contains 0.5 to 10 parts by weight of the Lewis acid-amine complex (C) based on the total amount (100 parts by weight) of the alicyclic epoxy compound (A) and polymer polyol (B) contained in the epoxy resin composition.

[20] The epoxy resin composition according to any one of [1] to [19], further containing an antioxidant.

[21] The epoxy resin composition according to [20], wherein the antioxidant is a phosphite ester compound.

[22] The epoxy resin composition according to [21], wherein the phosphite ester compound is at least one selected from the group consisting of a compound represented by the following formula (I):

[Formula 8]

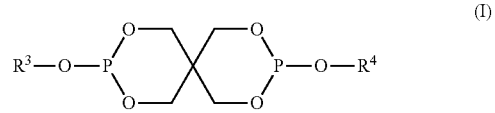

(I)

wherein R$^3$ and R$^4$ are the same or different and represent a substituted or unsubstituted hydrocarbon group, and a compound represented by the following formula (II):

[Formula 9]

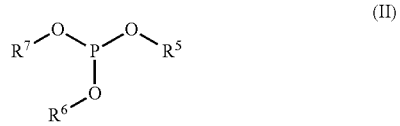

(II)

wherein $R^5$, $R^6$, and $R^7$ are the same or different and represent a substituted or unsubstituted hydrocarbon group.

[23] The epoxy resin composition according to any one of [20] to [22], wherein the epoxy resin composition contains 0.1 to 5 parts by weight of the antioxidant based on the total amount (100 parts by weight) of the epoxy compound contained in the epoxy resin composition.

[24] The epoxy resin composition according to any one of [1] to [23], wherein a viscosity of the epoxy resin composition at 25° C. is 1 to 10000 mPa·s.

[25] The epoxy resin composition according to any one of [1] to [24], further containing at least one selected from the group consisting of a silica filler and glass bubble.

[26] A cured product of the epoxy resin composition according to any one of [1] to [25].

[27] The epoxy resin composition according to any one of [1] to [25], wherein the epoxy resin composition is a resin composition for forming a syntactic foam.

[28] A syntactic foam containing: a cured product of the epoxy resin composition according to [27]; and microballoons dispersed in the cured product.

Advantageous Effects of Invention

Because the epoxy resin composition of the present invention has the above composition, the epoxy resin composition can be cured by heating at low temperatures, and suppresses heat generation associated with curing. An alicyclic epoxy compound (A) and a polymer polyol (B) are mainly selected, which can provide a low viscosity and ease in handling. For this reason, the epoxy resin composition of the present invention can be particularly preferably used as a resin composition for forming a syntactic foam. The use of the epoxy resin composition of the present invention as the resin composition for forming a syntactic foam can provide a syntactic foam having high productivity and an excellent quality.

DESCRIPTION OF EMBODIMENTS

<Epoxy Resin Composition>

Figure 1:
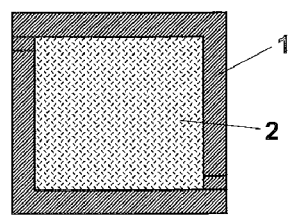
FIG. 1 is a schematic view (sectional view) showing an example of a structure where a container is filled with a syntactic foam.

An epoxy resin composition of the present invention (curable epoxy resin composition) contains: an alicyclic epoxy compound (A); a polymer polyol having two or more terminal hydroxyl groups (B) (sometimes merely referred to as a "polymer polyol (B)"); and a Lewis acid-amine complex (C) as essential components. The epoxy resin composition of the present invention may contain optional components such as an antioxidant to be described later other than the essential components.

[Alicyclic Epoxy Compound (A)]

The alicyclic epoxy compound (A) in the epoxy resin composition of the present invention is a compound having one or more aliphatic rings (aliphatic hydrocarbon rings) and one or more epoxy groups per molecule. Examples of the alicyclic epoxy compound (A) include (i) a compound having at least one (preferably two or more) alicyclic epoxy group (an epoxy group composed of an oxygen atom and adjacent two carbon atoms constituting an aliphatic ring) per molecule; (ii) a compound having an epoxy group directly bonded to an aliphatic ring via a single bond; and (iii) a compound having an aliphatic ring and a glycidyl group.

The alicyclic epoxy group in (i) the above-mentioned compound having at least one alicyclic epoxy group per molecule is not particularly limited, but among them, a cyclohexene oxide group (an epoxy group composed of an oxygen atom and adjacent two carbon atoms constituting a cyclohexane ring) is preferable from the viewpoint of curability.

Particularly, from the viewpoints of the transparency and heat resistance of a cured product, (i) the compound having at least one alicyclic epoxy group per molecule is preferably a compound having two or more cyclohexene oxide groups per molecule, and more preferably a compound represented by the following formula (1). When the epoxy resin composition of the present invention contains the compound represented by the formula (1), the epoxy resin composition tends to have a lower viscosity.

[Formula 10]

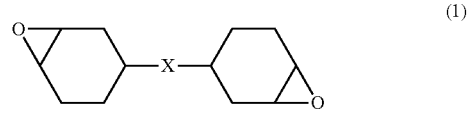

(1)

In the formula (1), X represents a single bond or a linking group (a divalent group having one or more atoms). Examples of the linking group include a divalent hydrocarbon group, an alkenylene group whose carbon-carbon double bonds are wholly or partially epoxidized, a carbonyl group, an ether bond, an ester bond, a carbonate group, an amide group, and a group formed by linking a plurality of these.

Examples of the compound in the formula (1) where X is a single bond include 3,4,3',4'-diepoxybicyclohexane.

Examples of the divalent hydrocarbon group include a linear or branched-chain alkylene group having 1 to 18 carbon atoms and a divalent alicyclic hydrocarbon group. Examples of the linear or branched-chain alkylene group having 1 to 18 carbon atoms include a methylene group, a methylmethylene group, a dimethylmethylene group, an ethylene group, a propylene group, and a trimethylene group. Examples of the divalent alicyclic hydrocarbon group include divalent cycloalkylene groups (including cycloalkylidene groups) such as a 1,2-cyclopentylene group, a 1,3-cyclopentylene group, a cyclopentylidene group, a 1,2- cyclohexylene group, a 1,3-cyclohexylene group, a 1,4-cyclohexylene group, and a cyclohexylidene group.

Examples of the alkenylene group in the alkenylene group whose carbon-carbon double bonds are wholly or partially epoxidized (sometimes referred to as an "epoxidized alkenylene group") include linear or branched-chain alkenylene groups having 2 to 8 carbon atoms such as a vinylene group, a propenylene group, a 1-butenylene group, a 2-butenylene group, a butadienylene group, a pentenylene group, a hexenylene group, a heptenylene group, and an octenylene group. As the epoxidized alkenylene group, particularly, an alkenylene group whose carbon-carbon double bonds are wholly epoxidized is preferable, and an alkenylene group having 2 to 4 carbon atoms, whose carbon-carbon double bonds are wholly epoxidized is more preferable.

As the linking group X, particularly, a linking group having an oxygen atom is preferable. Specific examples thereof include —CO—, —O—CO—O—, —COO—, —O—, —CONH—, an epoxidized alkenylene group; a group formed by linking a plurality of these groups; and a group formed by linking one or two or more of these groups and one or two or more divalent hydrocarbon groups. Examples of the divalent hydrocarbon group include the same as exemplified above.

Typical examples of the compound represented by the above formula (1) include 2,2-bis(3,4-epoxycyclohexane-1-yl)propane, bis(3,4-epoxycyclohexylmethyl) ether, 1,2-bis(3,4-epoxycyclohexane-1-yl)ethane, 1,2-epoxy-1,2-bis(3,4-epoxycyclohexane-1-yl)ethane, and compounds represented by the following formulae (1-1) to (1-10). In the following formulae (1-5) and (1-7), "l" and "m" each represent an integer of 1 to 30. In the following formula (1-5), R represents an alkylene group having 1 to 8 carbon atoms, and examples thereof include linear or branched-chain alkylene groups such as a methylene group, an ethylene group, a propylene group, an isopropylene group, a butylene group, an isobutylene group, an s-butylene group, a pentylene group, a hexylene group, a heptylene group, and an octylene group. Among them, linear or branched-chain alkylene groups having 1 to 3 carbon atoms such as a methylene group, an ethylene group, a propylene group, and an isopropylene group are preferable. In the following formulae (1-9) and (1-10), n1 to n6 each represent an integer of 1 to 30.

[Formula 11]

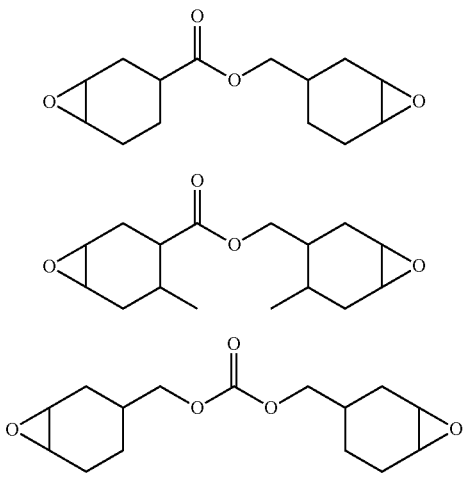

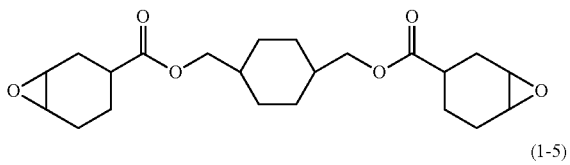

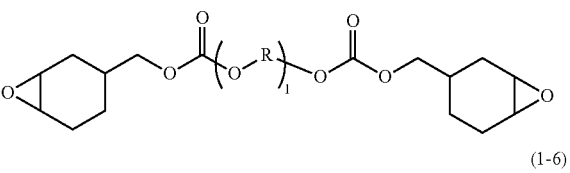

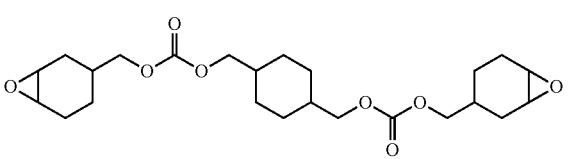

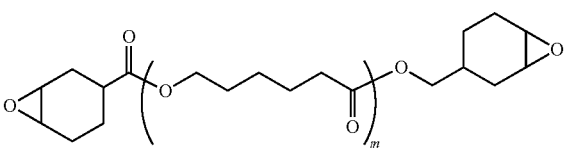

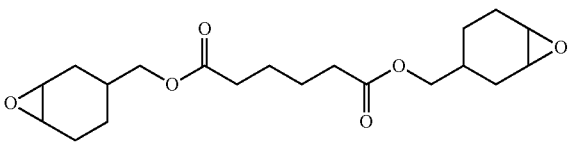

[Formula 12]

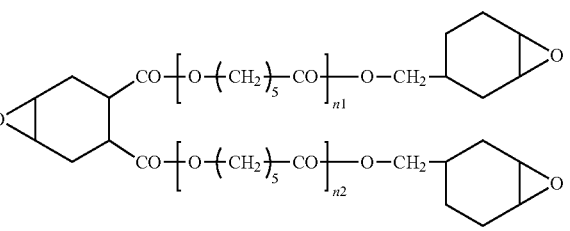

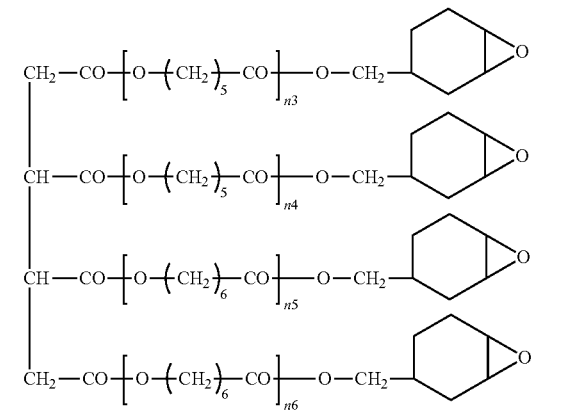

Examples of (ii) the above-mentioned compound having an epoxy group directly bonded to an aliphatic ring via a single bond include a compound represented by the following formula (2).

[Formula 13]

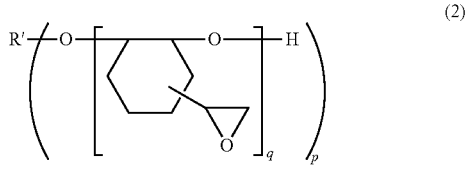

(2)

In the formula (2), R' is a group (p-hydric organic group) formed by removing a number "p" of hydroxy groups (—OH) from the structural formula of a p-hydric alcohol, and "p" and "q" each represent a natural number. Examples of the p-hydric alcohol [R'(OH)$_p$] include polyhydric alcohols (alcohols having 1 to 15 carbon atoms or the like) such as 2,2-bis(hydroxymethyl)-1-butanol). The number "p" is preferably 1 to 6; and the number "q" is preferably 1 to 30. When "p" is 2 or more, "q" in the groups in the brackets (round brackets) may be the same or different. Specific examples of the compound represented by the formula (2) include a 1,2-epoxy-4-(2-oxiranyl)cyclohexane adduct of 2,2-bis(hydroxymethyl)-1-butanol [e.g., the trade name "EHPE3150" (manufactured by Daicel Corporation) or the like].

Examples of (iii) the above-mentioned compound having an aliphatic ring and a glycidyl group include 2,2-bis[4-(2,3-epoxypropoxy)cyclohexyl]propane, 2,2-bis[3,5-dimethyl-4-(2,3-epoxypropoxy)cyclohexyl]propane, and a compound obtained by hydrogenating a bisphenol A type epoxy compound (hydrogenated bisphenol A type epoxy compound); bis[o,o-(2,3-epoxypropoxy)cyclohexyl]methane, bis[o,p-(2,3-epoxypropoxy)cyclohexyl]methane, bis[p,p-(2,3-epoxypropoxy)cyclohexyl]methane, bis[3,5-dimethyl-4-(2,3-epoxypropoxy)cyclohexyl]methane, and a compound obtained by hydrogenating a bisphenol F type epoxy compound (hydrogenated bisphenol F type epoxy compound); a hydrogenated biphenol epoxy compound; a hydrogenated phenol novolak epoxy compound; hydrogenated cresol novolak epoxy compound; a hydrogenated cresol novolak epoxy compound of bisphenol A; a hydrogenated naphthalene type epoxy compound; and a hydrogenated epoxy compound obtained by hydrogenating an epoxy compound obtained from trisphenolmethane.

Among them, the alicyclic epoxy compound (A) is preferably (i) the compound having at least one alicyclic epoxy group per molecule in terms of high reactivity with the Lewis acid-amine complex (C). Particularly, the alicyclic epoxy compound (A) is more preferably the compound represented by the formula (1) in terms of providing the lower viscosity of the epoxy resin composition or further improving the heat resistance of the cured product, and still more preferably the compound represented by the formula (1-1) [3,4-epoxycyclohexylmethyl (3,4-epoxy)cyclohexanecarboxylate; e.g., the trade name "CELLOXIDE 2021P" (manufactured by Daicel Corporation) or the like].

In the epoxy resin composition of the present invention, the alicyclic epoxy compound (A) may be used alone or in combination of two or more. The alicyclic epoxy compound (A) can be manufactured by known or customary methods. For example, commercial products can be also used such as the trade names "CELLOXIDE 2021P" and "CELLOXIDE 2081" (each manufactured by Daicel Corporation) as the alicyclic epoxy compound (A).

The content (amount blended) of the alicyclic epoxy compound (A) in the epoxy resin composition of the present invention is not particularly limited, and is preferably 30 to 98% by weight, more preferably 40 to 95% by weight, and still more preferably 50 to 90% by weight based on the total amount (100% by weight) of the epoxy resin composition. When the content of the alicyclic epoxy compound (A) is not less than 30% by weight, the lower viscosity of the epoxy resin composition is provided, and the heat resistance of the cured product tends to be further improved. In contrast, when the content of the alicyclic epoxy compound (A) is not more than 98% by weight, the amount of the polymer polyol (B) can be relatively increased, which tends to allow heat generation associated with a curing reaction to be suppressed to a lower level.

The ratio of the alicyclic epoxy compound (A) to the total amount (100% by weight) of the epoxy compound (compound having an epoxy group) contained in the epoxy resin composition of the present invention is not particularly limited, and is preferably not less than 50% by weight (e.g., 50 to 100% by weight), and more preferably not less than 70% by weight (e.g., 70 to 95% by weight). When the ratio of the alicyclic epoxy compound (A) is not less than 50% by weight, the lower viscosity of the epoxy resin composition is provided, and the heat resistance of the cured product tends to be further improved.

[Polymer Polyol Having Two Or More Terminal Hydroxyl Groups (B)]

The polymer polyol (B) in the epoxy resin composition of the present invention is a polymer (including also an oligomer) having two or more terminal hydroxyl groups (hydroxyl group located at the terminal of a molecular chain) per molecule. The terminal hydroxyl group in the polymer polyol (B) may be an alcoholic hydroxyl group or a phenolic hydroxyl group.

The hydroxy value of the polymer polyol (B) is not particularly limited, and is preferably 10 to 800 mgKOH/g, and more preferably 50 to 600 mgKOH/g. When the hydroxy value is not less than 10 mgKOH/g, the mechanical characteristics of the cured product or syntactic foam tend to be further improved. In contrast, when the hydroxy value is not more than 800 mgKOH/g, heat generation associated with a curing reaction is more efficiently suppressed, and the mechanical characteristics of the cured product or syntactic foam tend to be further improved. The hydroxy value of the polymer polyol (B) can be measured according to the method described in JIS K0070.

The polymer polyol (B) may be a liquid or a solid at 25° C. Among them, the polymer polyol (B) is preferably a liquid at 25° C. because an epoxy resin composition having a low viscosity can be easily obtained. When the polymer polyol (B) is a liquid at 25° C., the viscosity of the polymer polyol (B) at 25° C. is not particularly limited, and is preferably 100 to 25000 mPa·s, and more preferably 500 to 10000 mPa·s. The viscosity of the polymer polyol (B) can be measured by the same method as that in the viscosity of the epoxy resin composition to be described later.

The number average molecular weight of the polymer polyol (B) is not particularly limited, and is preferably 200 to 10000, more preferably 300 to 5000, and still more preferably 400 to 4000. When the number average molecular weight is not less than 200, heat generation associated with a curing reaction is further suppressed, and the mechanical strength of the cured product or syntactic foam tends to be further improved. In contrast, when the number average molecular weight is not more than 10000, the epoxy resin composition is likely to exhibit a liquid form at room temperature (25° C.), which provides an improvement in the handling property of the epoxy resin composition and tends to further facilitate the preparation of the epoxy resin composition. An epoxy resin composition having a lower viscosity tends to be likely to be obtained. The number average molecular weight of the polymer polyol (B) can be calculated from a molecular weight measured by gel permeation chromatography and calibrated with a polystyrene standard.

The polymer polyol (B) may be a straight-chain polymer polyol or a branched-chain polymer polyol.

Examples of the polymer polyol (B) include known or customary polymer polyols such as a polyester polyol, a polycarbonate polyol, a polyacryl polyol, a polyether polyol, an epoxy polyol, a polyolefin polyol, and a polyether ester polyol. Among them, the polyester polyol is preferable from the viewpoints of having excellent compatibility with another component in the epoxy resin composition and improving the toughness of the cured product.

The polyester polyol as the polymer polyol (B) is a polyester polyol having an oligoester or a polyester skeleton per molecule and having two or more terminal hydroxyl groups per molecule. Examples of the polyester polyol include a polyester polyol obtained by subjecting a monomer component of polyester to polymerization (polycondensation and ring-opening polymerization or the like) such as a polyol (including also a derivative thereof), a polycarboxylic acid (including also a derivative thereof), a hydroxycarboxylic acid (including also a derivative thereof), and a lactone (including also a derivative thereof).

Examples of the polyol as the monomer component of the polyester polyol include ethylene glycol, diethylene glycol, 1,3-propanediol, 1,4-butanediol, 1,3-butanediol, 2,3-butanediol, 1,5-pentanediol, 3-methyl-1,5-pentanediol, 1,6-hexanediol, 2,6-hexanediol, 1,4-cyclohexanedimethanol, 1,12-dodecanediol, polybutadienediols, neopentyl glycol, tetramethylene glycol, propylene glycol, dipropylene glycol, glycerol, trimethylolpropane, 1,3-dihydroxyacetone, hexylene glycol, 1,2,6-hexanetriol, ditrimethylolpropane, pentaerythritol, and derivatives thereof.

Examples of the polycarboxylic acid as the monomer component of the polyester polyol include oxalic acid, adipic acid, sebacic acid, fumaric acid, malonic acid, succinic acid, glutaric acid, azelaic acid, citric acid, 2,6-naphthalenedicarboxylic acid, phthalic acid, isophthalic acid, terephthalic acid, citraconic acid, 1,10-decanedicarboxylic acid, methylhexahydrophthalic acid, hexahydrophthalic acid, methyltetrahydrophthalic acid, tetrahydrophthalic acid, pyromellitic acid, trimellitic acid, and derivatives thereof (e.g., acid anhydrides such as methylhexahydrophthalic anhydride, hexahydrophthalic anhydride, methyltetrahydrophthalic anhydride, tetrahydrophthalic anhydride, pyromellitic anhydride, and trimellitic anhydride).

Examples of the hydroxycarboxylic acid as the monomer component of the polyester polyol include lactic acid, malic acid, glycolic acid, dimethylolpropionic acid, dimethylolbutanoic acid, and derivatives thereof.

Examples of the lactone as the monomer component of the polyester polyol include 4- to 10-membered lactones such as γ-butyrolactone, δ-valerolactone, and ε-caprolactone.

Among them, the polyester polyol is preferably a compound having two or more terminal hydroxy groups per molecule, and having, per molecule, at least a structure unit [—C(O)—$R^L$—O—] ($R^L$ represents an alkylene group (sometimes referred to as a "lactone unit") (sometimes referred to as a lactone adduct compound) which is formed by subjecting a lactone (lactones) to a ring-opening addition reaction (including also ring-opening addition polymerization). The lactone constituting the lactone unit in the lactone adduct compound is preferably ε-caprolactone. That is, the lactone adduct compound is preferably a compound having two or more terminal hydroxy groups per molecule, and having, per molecule, at least a structure unit [—C(O)—$(CH_2)_5$—O—] (ε-caprolactone adduct compound) which is formed by subjecting ε-caprolactone to a ring-opening addition reaction (including also ring-opening addition polymerization). The lactone adduct compound may have only one lactone unit, or may have two or more lactone units.

The number (total number) of the lactone units in the molecule of the lactone adduct compound is not particularly limited as long as being 1 or more, and preferably 2 or more (e.g., 2 to 40). When the lactone adduct compound has a structure where two or more lactone units are repeatedly directly bonded (polymerized), the number of repetition of the lactone units in the structure (polymerization degree) is not particularly limited, and is preferably 2 to 20. The lactone unit in the structure may be added in a random form or a block form without particular limitation;

The number (total number) of the hydroxy groups in the molecule of the lactone adduct compound is not particularly limited as long as being 2 or more, and preferably 2 to 10, and more preferably 2 to 4.

The lactone adduct compound is not particularly limited, and is obtained by subjecting a lactone to a ring-opening addition reaction (including also ring-opening addition polymerization) in the presence of a compound having one or more hydroxy groups per molecule (initiator), for example. Examples of the compound having one or more hydroxy groups per molecule include aliphatic alcohols such as methanol, ethanol, propanol, butanol, pentanol, hexanol, and octanol; aromatic alcohols such as benzyl alcohol; polyhydric alcohols such as ethylene glycol, diethylene glycol, triethylene glycol, polyethylene glycol, propylene glycol, dipropylene glycol, 1,3-butanediol, 1,4-butanediol, pentanediol, methyl pentanediol, 2,4-diethyl pentanediol, 1,6-hexandiol, 2-ethyl-1,3-hexandiol, neopentyl glycol, neopentyl glycol ester, cyclohexane dimethanol, glycerin, diglycerin, polyglycerin, trimethylolpropane, ditrimethylolpropane, pentaerythritol, dipentaerythritol, hydrogenated bisphenol A, hydrogenated bisphenol F, and hydrogenated bisphenol S; phenol, biphenol, cresol, catechol, pyrogallol, hydroquinone, hydroquinone monomethyl ether, bisphenol A, bisphenol F, 4,4'-dihydroxy benzophenone, bisphenol S, an alkylene oxide adduct of bisphenol A, an alkylene oxide adduct of bisphenol F, an alkylene oxide adduct of bisphenol S, a phenol novolac resin, and a cresol novolac resin; and oligomers or polymers having hydroxy groups such as polyvinyl alcohol, a partial hydrolysate of polyvinyl acetate, starch, an acrylic polyol, a styrene-allyl alcohol copolymerization resin, a polyester polyol, a polycaprolactone polyol, a polypropylene polyol, a polytetramethylene glycol, a polycarbonate polyol, polybutadiene having a hydroxy group, and cellulose-based polymers (e.g., cellulose, cellulose acetate, cellulose acetate butyrate, and hydroxyethylcellulose).

The lactone can be subjected to a ring-opening addition reaction by known or customary methods without particular limitation. For example, the lactone can be subjected to a ring-opening addition reaction by mixing and stirring the lactone in the presence of an initiator while heating the lactone if needed. The amounts of the initiator and lactone to be used (amounts charged) can be appropriately adjusted according to the molecular weight or the like of the intended lactone adduct compound without particular limitation. In the ring-opening addition reaction, known or customary catalysts can be also used such as tetrabutyl titanate, tetraisopropyl titanate, tetraethyl titanate, dibutyltin oxide, dibutyltin laurate, tin octylate, and stannous chloride if needed. The amount of the catalyst to be used can be appropriately selected according to the kinds and reaction conditions or the like of the initiator and lactone without particular limitation.

Examples of the lactone adduct compound include a compound represented by the following formula (3).

[Formula 14]

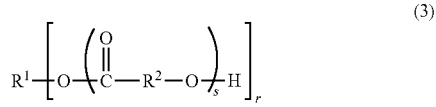

(3)

In the formula (3), "r" represents an integer of 1 to 20. In the formula (3), $R^1$ represents an organic group (organic residue) formed by removing a number "r" of hydroxy groups from the structural formula $[R^1(OH)_r]$ of a compound having a number "r" of hydroxy groups per molecule. Examples of the organic group include an organic group formed by removing one or more (a number "r" of) hydroxy groups from the structural formula of the compound having a number "r" of hydroxy groups per molecule.

In the formula (3), "s" means the number of repetition of structures (lactone units) in a bracket with "s", and represents an integer of 0 to 10. The total number of "s" in the formula (3) is an integer of 1 or more. When "r" is an integer of 2 or more, a plurality of "s" may be the same or different.

$R^2$ in the formula (3) represents an alkylene group, and examples thereof include linear or branched-chain alkylene groups having 1 to 18 carbon atoms such as a methylene group, a methylmethylene group, a dimethylmethylene group, an ethylene group, a propylene group, a trimethylene group, a tetramethylene group, and a pentamethylene group. Among them, $R^2$ is preferably a pentamethylene group. When a plurality of $R^2$ are present in the formula (3), these may be the same or different. The structure (lactone unit) in the bracket with "s" may be added in a random form or a block form without particular limitation.

In the epoxy resin composition of the present invention, the polymer polyol (B) may be used alone or in combination of two or more. Commercial products can be also used such as the trade names "PLACCEL 205", "PLACCEL 205U", "PLACCEL L205AL", "PLACCEL 208", "PLACCEL 210", "PLACCEL 210N", "PLACCEL 212", "PLACCEL L212AL", "PLACCEL 220", "PLACCEL 220N", "PLACCEL 220NP1", "PLACCEL L220AL", "PLACCEL 230", "PLACCEL 230N", "PLACCEL 240", "PLACCEL 303", "PLACCEL 305", "PLACCEL 308", "PLACCEL 312", "PLACCEL 405D", "PLACCEL L320AL", "PLACCEL CD205", "PLACCEL CD210", "PLACCEL CD 220", "PLACCEL CD 205PL", "PLACCEL CD 205HL", "PLACCEL CD 210PL", "PLACCEL CD 210HL", "PLACCEL CD 220PL", "PLACCEL CD 220HL", "PLACCEL CD 220EC", "PLACCEL CD 221T", "EPOLEAD PB3600", "CELLTOP D446", "PLACCEL DC2009", "PLACCEL DC2016", "PLACCEL DC2209", "PLACCEL EPA2250", and "PLACCEL EPA5860" (each manufactured by Daicel Corporation); the trade names "ETERNACOLL UH-CARB50", "ETERNACOLL UH-CARB100", "ETERNACOLL UH-CARB300", "ETERNACOLL UH-CARB90 (1/3)", "ETERNACOLL UH-CARB90 (1/1)", and "ETERNACOLL UH-CARB100" (each manufactured by Ube Industries, Ltd.); the trade names "DURANOL T6002", "DURANOL T5652", "DURANOL T4672", "DURANOL T4692", and "DURANOL G3452" (each manufactured by Asahi Kasei Chemicals Corporation); the trade name "TOE-2000H" (manufactured by Kyowa Hakko Chemical Co., Ltd.); the trade names "Poly bd R-45HT", "Poly bd R-15HT", "Poly ip", and "EPOL" (each manufactured by Idemitsu Kosan Co., Ltd.); the trade name "KURAPOL" (manufactured by Kuraray Co., Ltd.); the trade names "P-400", "P-700", "P-1000", "P-2000", "P-3000", "G-300", "G-400", "G-700", "G-1500", "G-3000", "G-4000", "EDP-450", "EDP-550", "DG-500", "DG-575", "SP-600", "SP-690SC-800", "SC-1000", "SC-1001", and "QUODOROLE" (each manufactured by ADEKA CORPORATION) as the polymer polyol (B).

The content (amount blended) of the polymer polyol (B) in the epoxy resin composition of the present invention is not particularly limited, and is preferably 1 to 70 parts by weight, more preferably 2 to 50 parts by weight, and still more preferably 5 to 30 parts by weight based on 100 parts by weight of the alicyclic epoxy compound (A). When the content of the polymer polyol (B) is not less than 1 part by weight, heat generation associated with a curing reaction tends to be suppressed to a lower level. In contrast, when the content of the polymer polyol (B) is not more than 70 parts by weight, a curing reaction tends to proceed sufficiently in a shorter time.

The content (amount blended) of the polymer polyol (B) in the epoxy resin composition of the present invention is preferably 50 to 2000 parts by weight, more preferably 100 to 1500 parts by weight, and still more preferably 200 to 800 parts by weight based on 100 parts by weight of the Lewis acid-amine complex (C). When the content of the polymer polyol (B) is not less than 50 parts by weight, heat generation associated with a curing reaction tends to be suppressed to a lower level. In contrast, when the content of the polymer polyol (B) is not more than 2000 parts by weight, a curing reaction tends to proceed sufficiently in a shorter time.

[Lewis Acid-Amine Complex (C)]

The Lewis acid-amine complex (C) in the epoxy resin composition of the present invention is a complex (an amine complex of a Lewis acid) composed of n a Lewis acid and an amine (amine compound). Examples of the Lewis acid constituting the Lewis acid-amine complex (C) include known or customary Lewis acids without particular limitation, and examples thereof include halogenated metals (e.g., titanium tetrachloride, tin tetrachloride, zirconium chloride, aluminum chloride, iron chloride, zinc chloride, copper chloride, antimony chloride, and zinc bromide or the like); boron halide compounds (e.g., boron trifluoride, boron trichloride, and boron tribromide or the like); phosphorus halide compounds (e.g., phosphorus pentafluoride and phosphorous pentachloride or the like); arsenic halide compounds (e.g., arsenic pentafluoride or the like); antimony halide compounds (e.g., antimony pentafluoride or the like); and metal triflate compounds (e.g., trimethylsilyl trifluoromethanesulfonate, scandium triflate, yttrium triflate, and zinc triflate or the like). Among them, from the viewpoint of causing a curing reaction to proceed at low temperatures to suppress heat generation associated with the curing reaction, the boron halide compounds are preferable.

Examples of the amine constituting the Lewis acid-amine complex (C) include known or customary amines without particular limitation, and examples thereof include known or customary amine compounds (ammonia, a primary amine, a secondary amine, and a tertiary amine) such as ammonia, an aliphatic amine, an alicyclic amine, an aromatic amine, and a heterocyclic amine. More specific examples thereof include ammonia, monomethylamine, dimethylamine, trimethylamine, monoethylamine, diethylamine, triethylamine, isopropylamine, n-butylamine, pentylamine, n-hexylamine, octylamine, dodecylamine, laurylamine, 4,4-diaminodiphenylamine, isophoronediamine, triethylenetetramine, benzylamine, piperidine, aniline, monoethanolamine, diethanolamine, triethanolamine, cyclohexylamine, morpholine, guanidine, N-alkylmorpholine, 1,8-diazabicyclo[5.4.0]undecene-7,6-dibutylamino-1,8-diazabicyclo[5.4.0]undecene-7, 1,5-diazabicyclo[4.3.0]nonene-5,1,4-diazabicyclo[2.2.2] octane, pyridine, N-alkylpiperidine, 1,5,7-triazabicyclo [4.4.0]dec-5-ene, and 7-methyl-1,5,7-triazabicyclo[4.4.0] dec-5-ene. Among them, from the viewpoint of causing a curing reaction to proceed at low temperatures to suppress heat generation associated with the curing reaction, the aliphatic amine is preferable.

More specific examples of the Lewis acid-amine complex (C) include $BF_3$.n-hexylamine, $BF_3$.monoethylamine, $BF_3$.benzylamine, $BF_3$.diethylamine, $BF_3$.piperidine, $BF_3$.triethylamine, $BF_3$.aniline, $BF_4$.n-hexylamine, $BF_4$.monoethylamine, $BF_4$.benzylamine, $BF_4$.diethylamine, $BF_4$.piperidine, $BF_4$.triethylamine, $BF_4$.aniline, $PF_5$.ethylamine, $PF_5$.isopropylamine, $PF_5$.butylamine, $PF_5$.laurylamine, $PF_5$.benzylamine, and $AsF_5$.laurylamine. Among them, the amine complex of boron trifluoride (particularly, the aliphatic amine complex of boron trifluoride) is preferable.

In the epoxy resin composition of the present invention, the Lewis acid-amine complex (C) may be used alone or in combination of two or more. The Lewis acid-amine complex (C) can also be manufactured by a method including bringing a Lewis acid and an amine into contact with each other to form a complex according to known or customary methods, or the like, and commercial products can also be used.

The content (amount blended) of the Lewis acid-amine complex (C) in the epoxy resin composition of the present invention is not particularly limited, and is preferably 0.5 to 10 parts by weight, and more preferably 1 to 5 parts by weight based on the total amount (100 parts by weight) of the alicyclic epoxy compound (A) and polymer polyol (B) contained in the epoxy resin composition. When the content of the Lewis acid-amine complex (C) is not less than 0.5 parts by weight, a curing reaction tends to proceed more efficiently. In contrast, when the content of the Lewis acid-amine complex (C) is not more than 10 parts by weight, heat generation associated with a curing reaction is suppressed, and the heat resistance and mechanical characteristics of the cured product tend to be further improved.

Particularly, the epoxy resin composition of the present invention exhibits an advantageous effect of suppressing heat generation associated with curing to a low level. The reason is not clear, but, this is presumed to be because the reactivity of the Lewis acid-amine complex (C) is moderately relieved by using a polymer polyol (B) and a Lewis acid-amine complex (C) in combination in the epoxy resin composition of the present invention.

[Antioxidant]

The epoxy resin composition of the present invention preferably further contains an antioxidant. The epoxy resin composition contains the antioxidant, which suppresses the temporal increase in the viscosity of the epoxy resin composition and further improves the heat resistance of the cured product. Usable examples of the antioxidant include known or customary antioxidants without particular limitation, and examples thereof include a phenol-based compound (phenol-based antioxidant), a hindered amine-based compound (hindered amine-based antioxidant), a phosphorus-based compound (phosphorus-based antioxidant), and a sulfur-based compound (sulfur-based antioxidant).

Examples of the phenol-based compound include monophenols such as 2,6-di-t-butyl-p-cresol, butylated hydroxyanisole, 2,6-di-t-butyl-p-ethylphenol, and stearyl-β-(3,5-di-t-butyl-4-hydroxyphenyl)propionate; bisphenols such as 2,2'-methylenebis(4-methyl-6-t-butylphenol), 2,2'-methylenebis(4-ethyl-6-t-butylphenol), 4,4'-thiobis(3-methyl-6-t-butylphenol), 4,4'-butylidenebis(3-methyl-6-t-butylphenol), and 3,9-bis[1,1-dimethyl-2-{β-(3-t-butyl-4-hydroxy-5-methylphenyl)propionyloxy}ethyl]2,4,8,10-tetraoxaspiro[5,5]undecane; and high molecular type phenols such as 1,1,3-tris(2-methyl-4-hydroxy-5-t-butyl phenyl)butane, 1,3,5-trimethyl-2,4,6-tris(3,5-di-t-butyl-4-hydroxybenzyl) benzene, tetrakis[methylene-3-(3',5'-di-t-butyl-4'-hydroxyphenyl)propionate]methane, bis[3,3'-bis-(4'-hydroxy-3'-t-butyl phenyl)butylic acid]glycol ester, 1,3,5-tris(3',5'-di-t-butyl-4'-hydroxybenzyl)-s-triazine-2,4,6-(1H, 3H,5H)trione, and tocophenol.

Examples of the hindered amine-based compound include bis(1,2,2,6,6-pentamethyl-4-piperidyl)[[3,5-bis(1,1-dimethylethyl)-4-hydroxyphenyl]methyl]butylmalonate, bis(1, 2,2,6,6-pentamethyl-4-piperidyl) sebacate, methyl-1,2,2,6, 6-pentamethyl-4-piperidyl sebacate, and 4-benzoyloxy-2,2, 6,6-tetramethylpiperidine.

Examples of the phosphorus-based compound include phosphites such as triphenyl phosphite, diphenyl isodecyl phosphite, phenyl diisodecyl phosphite, tris(nonylphenyl) phosphite, diisodecyl pentaerythritol phosphite, tris(2,4-di-t-butylphenyl) phosphite, cyclic neopentanetetrayl bis(octadecyl) phosphite, cyclic neopentanetetrayl bis(2,4-di-t-butylphenyl) phosphite, cyclic neopentanetetrayl bis(2,4-di-t-butyl-4-methylphenyl) phosphite, and bis[2-t-butyl-6-methyl-4-{2-(octadecyloxycarbonyl)ethyl}phenyl] hydrogene phosphite; and oxaphosphaphenanthrene oxides such as 9,10-dihydro-9-oxa-10-phosphaphenanthrene-10-oxide, 10-(3,5-di-t-butyl-4-hydroxybenzyl)-9, and 10-dihydro-9-oxa-10-phosphaphenanthrene-10-oxide.

Examples of the sulfur-based compound include dodecanethiol, dilauryl-3,3'-thiodipropionate, dimyristyl-3,3'-thiodipropionate, and distearyl-3,3'-thiodipropionate.

Among them, the antioxidant in the epoxy resin composition of the present invention is preferably the phosphorus-based compound because the phosphorus-based compound can suppress the temporal increase in the viscosity of the epoxy resin composition even when the epoxy resin composition contains glass bubble and a silica filler or the like, and particularly preferably a phosphite ester compound. Generally, it is presumed that when a composition containing an epoxy compound contains glass bubble and a silica filler, a silanol group in the glass bubble and the silica filler tends to be apt to cause the temporal increase in the viscosity of the composition.

Usable examples of the phosphite ester compound include known or customary phosphite ester compounds without particular limitation, and specifically, for example, a compound represented by the following formula (I) and a compound represented by the following formula (II) can be preferably used.

[Formula 15]

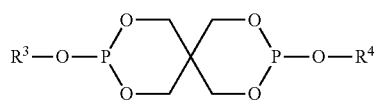

(I)

[Formula 16]

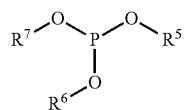

(II)

In the formula (I), $R^3$ and $R^4$ are the same or different and represent a substituted or unsubstituted hydrocarbon group (monovalent hydrocarbon group). Examples of the substituted or unsubstituted hydrocarbon group include alkyl groups [e.g., a methyl group, an ethyl group, a propyl group, a butyl group, a pentyl group, a hexyl group, and a 2-ethylhexyl group or the like], cycloalkyl groups [e.g., a cyclopropyl group, a cyclobutyl group, a cyclopentyl group, a cyclohexyl group, and a cyclododecyl group or the like], aryl groups [e.g., a phenyl group, a tolyl group, a xylyl group, a naphthyl group, a 2,6-di-t-butyl-4-methyl-1-phenyl group, and a 2,4-di-t-butyl-1-phenyl group or the like], cycloalkylalkyl groups [e.g., a cyclohexyl methyl group and a methylcyclohexyl group or the like], aralkyl groups [e.g., a benzyl group and a phenethyl group or the like], and halogenated hydrocarbon groups in which one or more hydrogen atoms in a hydrocarbon group are replaced by halogen atoms [e.g., alkyl halide groups such as a chloromethyl group, a 3-chloropropyl group, and a 3,3,3-trifluoropropyl group]; and groups in which one or more hydrogen atoms bonded to carbon atoms of these groups are replaced by functional groups such as a hydroxyl group, a carboxy group, a nitro group, a substituted or unsubstituted amino group, and a mercapto group.

Among them, $R^3$ and $R^4$ are the same or different, and preferably a substituted or unsubstituted alkyl group and a substituted or unsubstituted aryl group, and particularly, $R^3$ and $R^4$ are more preferably a substituted or unsubstituted alkyl group having 8 to 20 carbon atoms (the number of carbon atoms constituting an alkyl group) (e.g., a 2-ethylhexyl group or a stearyl group or the like), an aryl group (e.g., a phenyl group or the like), and an alkyl substituted aryl group (e.g., a 2,6-di-t-butyl-4-methyl-1-phenyl group or a 2,4-di-t-butyl-1-phenyl group or the like).

In the formula (II), $R^5$, $R^6$, and $R^7$ are the same or different and represent a substituted or unsubstituted hydrocarbon group (monovalent hydrocarbon group). Examples of the substituted or unsubstituted hydrocarbon group include the same hydrocarbon groups as those exemplified as $R^3$ and $R^4$. Particularly, $R^5$, $R^6$, and $R^7$ are the same or different, and preferably a substituted or unsubstituted alkyl group and a substituted or unsubstituted aryl group. Particularly, $R^5$, $R^6$, and $R^7$ are more preferably a substituted or unsubstituted alkyl group having 8 to 20 carbon atoms (the number of carbon atoms constituting an alkyl group) (e.g., a 2-ethylhexyl group or a stearyl group or the like), an aryl group (e.g., a phenyl group or the like), and an alkyl substituted aryl group (e.g., a 2,6-di-t-butyl-4-methyl-1-phenyl group or a 2,4-di-t-butyl-1-phenyl group or the like).

More specific examples of the phosphite ester compound include 9,10-dihydro-9-oxa-10-phosphaphenanthrene-10-oxide, bis(2,6-di-t-butyl-4-methylphenyl)pentaerythritol-diphosphite, bis(2,4-di-t-butylphenyl)pentaerythritol-diphosphite, tris(2,4-di-t-butylphenyl) phosphite, tris(mono- or di-nonylphenyl) phosphite, tris(2-ethylhexyl) phosphite, trisphenyl phosphite, tris(monononylphenyl) phosphite, and trisisodecyl phosphite.

The phosphite ester compound may be used alone or in combination of two or more. Usable examples of the phosphite ester compound include commercial products such as the trade names "JP-360" and "JP-308E" (each manufactured by Johoku Chemical Co., Ltd.); the trade name "IRGAFOS168" (manufactured by BASF A.G.); the trade name "Sanko Epoclean" (manufactured by SANKO CO., LTD.); and the trade names "ADK STAB 3010" and "ADK STAB PEP-36" (each manufactured by ADEKA CORPORATION).

In the epoxy resin composition of the present invention, the antioxidant may be used alone or in combination of two or more. Commercial products can also be used as the antioxidant.

The content (amount blended) of the antioxidant (particularly, the phosphite ester compound) in the epoxy resin composition of the present invention is not particularly limited, and is preferably 0.1 to 5 parts by weight, more preferably 0.2 to 3 parts by weight, and still more preferably 0.3 to 2 parts by weight based on the total amount (100% by weight) of the epoxy compound contained in the epoxy resin composition. When the content of the antioxidant is not less than 0.1 parts by weight, the temporal increase in the viscosity (the increase in the viscosity when the silica filler and the glass bubble are particularly contained) is more efficiently suppressed, and the heat resistance of the cured product tends to be further improved. In contrast, when the content of the antioxidant is not more than 5 parts by weight, cost of raw materials is further reduced, and defects such as the coloring of the cured product tends to be suppressed.

[Another Epoxy Compound]

The epoxy resin composition of the present invention may contain an epoxy compound other than the alicyclic epoxy compound (A) within a range that does not impair the effects of the present invention (sometimes referred to as "another epoxy compound"). Examples of the above another epoxy compound include known or customary epoxy compounds without particular limitation, and examples thereof include aromatic epoxy compounds such as aromatic glycidyl ether-based epoxy compounds [e.g., a bisphenol A type epoxy compound, a bisphenol F type epoxy compound, a biphenyl type epoxy compound, a phenol novolac type epoxy compound, a cresol novolac type epoxy compound, a cresol novolac type epoxy compound of bisphenol A, a naphthalene type epoxy compound, and an epoxy compound obtained from trisphenolmethane, or the like]; and aliphaticepoxy compounds such as an aliphatic glycidyl ether-based epoxy compound [for example, aliphatic polyglycidyl ether]. In the epoxy resin composition of the present invention, another epoxy compound may be used alone or in combination of two or more.

The content (amount blended) of another epoxy compound in the epoxy resin composition of the present invention is not particularly limited, and can be appropriately selected within a range of 0 to 20% by weight based on the total amount (100% by weight) of the epoxy compound contained in the epoxy resin composition.

[Another Component]

The epoxy resin composition of the present invention may contain another component other than the above within a range that does not impair the effects of the present invention. If, e.g., a compound having a hydroxyl group such as ethylene glycol, diethylene glycol, propylene glycol, or glycerin is added as another component, a curing reaction is allowed to proceed moderately. Other than this, customary additives such as a defoamer (silicone- or fluorine-based defoamer or the like), a leveling agent, a silane coupling agent (γ-glycidoxypropyltrimetoxysilane or 3-mercaptopropyltrimethoxysilane or the like), a surfactant agent, an inorganic filler (a silica filler or an alumina filler or the like), a flame retardant, a colorant, an ultraviolet absorber, an ion adsorbent, a pigment, a release agent, and an impact resistance imparting agent (a rubber particle or the like) can be used as another component within a range that does not impair the viscosity and transparency of the epoxy resin composition. Particularly, the addition of the silica filler as another component tends to allow the thermal expansion coefficient of the cured product or syntactic foam to be suppressed to a low level. Known or customary silica fillers can be used as the silica filler. The content (total amount) of another component is not particularly limited, and can be appropriately selected within a range of 0 to 20% by weight (e.g., 0.1 to 10% by weight) based on the epoxy resin composition (100% by weight) of the present invention.

The epoxy resin composition of the present invention may contain microballoons to be described later.

The epoxy resin composition of the present invention can be prepared by stirring and mixing the above-described components in a heated state if needed, without particular limitation. The epoxy resin composition of the present invention can be used as a one-component composition in which a premix of components is used as it is, or can be used as a multicomponent (e.g., two-component) composition in which, for example, two or more separately stored components are mixed in a predetermined proportion before use and used. The method of the above stirring and mixing is not particularly limited, and, for example, known or customary stirring and mixing means such as various mixers (e.g., a dissolver and a homogenizer), a kneader, a roll, a bead mill, and a planetary stirring apparatus can be used. After the stirring and mixing, defoaming may be performed under reduced pressure or vacuum.

The epoxy resin composition of the present invention preferably exhibits a liquid form (is a liquid) at 25° C. Specifically, the viscosity of the epoxy resin composition of the present invention at 25° C. is not particularly limited, and is preferably 1 to 10000 mPa·s, and more preferably 10 to 8000 mPa·s. By controlling the viscosity at 25° C. to the above range, the handling property of the epoxy resin composition is improved, which tends to allow a cured product having high productivity and a high quality to be obtained. Particularly, when the epoxy resin composition of the present invention is used as a resin composition for forming a syntactic foam, the viscosity of the epoxy resin composition at 25° C. in a state where the epoxy resin composition does not contain a glass balloon is preferably 1 to 1000 mPa·s, and more preferably 10 to 500 mPa·s because a container or a mold can be easily filled with the epoxy resin composition, and the productivity and quality of the syntactic foam can be remarkably improved. The viscosity of the epoxy resin composition of the present invention at 25° C. may be measured under conditions of a rotor: standard 1°34'×R24, temperature: 25° C., and the number of rotations: 100 rpm using a digital viscometer ("Model DVU-EII" manufactured by Tokimec, Inc.), for example.

<Cured Product>

A cured product can be obtained by curing the epoxy resin composition of the present invention. Known or customary means such as a heat treatment and an active energy ray irradiation treatment can be used as curing means. Because the epoxy resin composition of the present invention contains the Lewis acid-amine complex (C) as an essential component, the epoxy resin composition can be easily cured by heating. The temperature of the epoxy resin composition when being cured by heating (curing temperature) is not particularly limited, and is preferably 30 to 200° C., more preferably 40 to 150° C., and still more preferably 50 to 120° C. A time for heating the epoxy resin composition when being cured (curing time) is not particularly limited, and is preferably 0.1 to 48 hours, and more preferably 1 to 24 hours. When the curing temperature and the curing time are lower than the lower limit value of the above range, curing is apt to become insufficient. Conversely, when the curing temperature and the curing time are higher than the upper limit value of the above range, the epoxy resin composition or the cured product of the same is sometimes decomposed. Thus, both the cases are not preferable. The curing conditions vary depending upon individual conditions, and for example, can be appropriately controlled by reducing the curing time when the curing temperature is increased or by increasing the curing time when the curing temperature is lowered. Curing can be made in a single step or in multiple steps of two or more steps. Because the cured product of the present invention is the cured product of the epoxy resin composition of the present invention having the above composition, the cured product has excellent heat resistance.

The epoxy resin composition of the present invention is useful in that the epoxy resin composition can be cured in a comparatively short time (e.g., 1 to 24 hours) of not more than about 48 hours even when a comparatively low curing temperature of not more than 100° C. (e.g., 40 to 80° C.) is set. Because the epoxy resin composition of the present invention has small heat generation associated with a curing reaction, the epoxy resin composition suppresses excessive heat generation associated with a curing reaction even when a large-sized cured product which is apt to store heat is manufactured, and the curing process can be safely carried out without causing the runaway of the reaction, or the like. Furthermore, as described later, when the epoxy resin composition is cured in a container, a container having low heat resistance (e.g., a polyethylene container or the like) can also be used. Furthermore, the heat deterioration of a cured product by heat generation associated with a curing reaction is less likely to be generated, which provides a cured product having an excellent quality. For this reason, the epoxy resin composition of the present invention can be particularly preferably used as a resin composition for forming a syntactic foam (particularly, a large-sized syntactic foam) (sometimes referred to as a "resin composition for forming a syntactic foam"). As described above, the syntactic foam is a structure where microballoons (minute hollow spherical bodies) are dispersed in a matrix resin (polymer matrix).

<Syntactic Foam>

Known or customary methods for manufacturing a syntactic foam can be applied as a method for manufacturing a syntactic foam using the epoxy resin composition of the present invention (the syntactic foam manufactured by using the epoxy resin composition of the present invention is sometimes referred to as "a syntactic foam of the present invention") without particular limitation. For example, the syntactic foam of the present invention can be obtained by a method including impregnating microballoons with the epoxy resin composition of the present invention, and curing the epoxy resin composition. The syntactic foam of the present invention is a syntactic foam containing the cured product of the epoxy resin composition of the present invention and the microballoons dispersed in the cured product.

Known or customary microballoons used for the syntactic foam can be used as the microballoons in the syntactic foam of the present invention. The average particle diameter of the microballoons is not particularly limited, and can be appropriately selected from the range of 10 to 500 μm. The material of the microballoons is not particularly limited, and can be appropriately selected from inorganic substances (e.g., borosilicate glass, silica, carbon, and ceramic or the like) and organic substances (e.g., a thermoplastic resin and a thermosetting resin or the like). Among them, glass is preferable. That is, glass microballoons (glass bubble) are preferable as the microballoons in the syntactic foam of the present invention.

Specific examples of the method for manufacturing the syntactic foam (the syntactic foam of the present invention) using the epoxy resin composition of the present invention include a method including filling a mold with microballoons, impregnating the microballoons with the epoxy resin composition of the present invention, and curing the epoxy resin composition to manufacture a molded body of the syntactic foam; and a method including processing the molded body according to known or customary means. In more detail, for example, the syntactic foam of the present invention can be manufactured by methods disclosed in known Literatures such as Japanese Patent Laid-Open Nos. 2000-239433, 2003-206372, 2010-65178, 2012-17382, 2010-65181, and 2010-65183.

The syntactic foam of the present invention can be manufactured also by filling the container with the epoxy resin composition of the present invention and the microballoons and thereafter curing the epoxy resin composition. The structure thus manufactured is a structure having the container and the syntactic foam of the present invention included in the container. For example, the structure to which an appropriate member or the like is attached if needed is preferably used as a buoyancy material. FIG. 1 is a schematic view showing an example of such a structure. Numeral number 1 in FIG. 1 designates a container (exterior container), and numeral number 2 designates a syntactic foam. The material of the container in the structure is not particularly limited, and examples thereof include plastics, metals, ceramics, and composite materials thereof. When the epoxy resin composition of the present invention is used, the epoxy resin composition can be cured by heating at low temperatures, which provides a wide applicable range such as a container having low heat resistance (e.g., a polyethylene container) usable as the above container. The shape of the container, or the like is not particularly limited.

Figure 2:
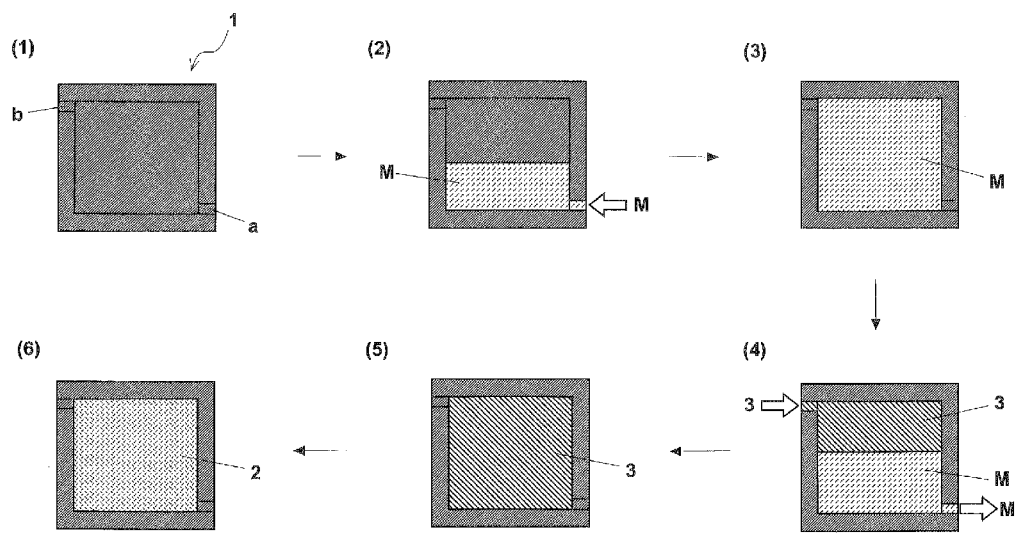
FIG. 2 is an illustration view (sectional view) showing an example of a method for manufacturing a structure where a container is filled with a syntactic foam.

FIG. 2 is an illustration view (sectional view) showing an example of a method for manufacturing the structure shown in FIG. 1. First, a container 1 designated by numeral number (1) of FIG. 2 is filled with microballoons (M) from a hole a of the lower part of the container 1 ((2) and (3) of FIG. 2). In this case, in order to improve the filling property of the microballoons, the container 1 can also be filled with a mixture of the microballoons and lubricant such as vaseline. After the container 1 is filled with the microballoons (M), the container 1 is filled with the mixture (dispersed product) 3 of the microballoons and epoxy resin composition of the present invention little by little from a hole b of the upper part of the container 1. At the same time the microballoons (M) with which the container 1 is first filled is discharged from the hole a of the lower part of the container 1 ((4) of FIG. 2). In this case, it is preferable that the interface between the microballoons (M) and the mixture 3 is finely held in that the syntactic foam having a uniform specific gravity is manufactured. Then, when the container 1 is filled with the mixture 3, the filling is stopped, and the hole a of the upper part and the hole b of the lower part of the container 1 are closed ((5) of FIG. 2). Finally, by heating the container 1 to cure the epoxy resin composition of the present invention in the container 1, a syntactic foam 2 is formed in the container 1, to obtain the above structure ((6) of FIG. 2). The method for manufacturing the structure is not limited to the method shown in FIG. 2.

The epoxy resin composition of the present invention is not limited to the above-mentioned resin composition for forming a syntactic foam, and can also be used in various applications such as sealing applications of semiconductor devices and optosemiconductor devices (sealing agents), adhesives, electrical insulating materials, laminates, coatings; inks, paints, sealants, resists, composite materials, transparent base materials, transparent sheets, transparent films, optical devices, optical lenses, optical members, stereolithography, electronic paper, touch panels, solar cell substrates, optical waveguides, light guide plates, and holographic memories.

EXAMPLES

Hereinafter, the present invention will be described in more detail based on Examples, but the present invention is not limited by these Examples. The amounts blended of components described in Tables 1 to 5 were represented by the amount of a product.

Example 1

As shown in Table 1, a flask was charged with 95 parts by weight of an alicyclic epoxy compound (the trade name "CELLOXIDE 2021P") manufactured by Daicel Corporation), 5 parts by weight of a polyester polyol (the trade name "PLACCEL 305", polycaprolactone triol manufactured by Daicel Corporation), and 0.475 parts by weight of bis(2,6-di-t-butyl-4-methylphenyl)pentaerythritol-diphosphite (the trade name "ADK STAB PEP-36" manufactured by ADEKA CORPORATION). These were heated and stirred at 100° C. for 2 hours to obtain a mixture, and the mixture was then cooled to room temperature. Then, 3.00 parts by weight of a boron trifluoride-monoethylamine complex (manufactured by Laborchemie Apolda GmbH) was added to the mixture, and these were mixed and stirred in a planetary centrifugal mixer (the trade name "AWATORIRENTARO" manufactured by THINKY CORPORATION) at room temperature for 10 minutes to prepare an epoxy resin composition.

Examples 2 to 9 and Comparative Examples 1 to 3

Epoxy resin compositions were prepared in the same manner as in Example 1 except that the constituents and blending ratios of the epoxy resin compositions were changed as shown in Tables 1 to 4.

[Evaluations]

The epoxy resin compositions obtained in Examples 1 to 9 and Comparative Examples 1 to 3 were subjected to evaluations as follows.

(1) Viscosity

The viscosities of the epoxy resin compositions obtained in Example 2 and Comparative Example 1 were measured under conditions of a rotor: standard 1°34'×R24, temperature: 25° C., and the number of rotations: 100 rpm using a digital viscometer ("Model DVU-EII" manufactured by Tokimec, Inc.).

As shown in Table 1, it was confirmed that both the epoxy resin composition obtained in Comparative Example 1 and the epoxy resin composition obtained in Example 2 corresponding to the epoxy resin composition of Comparative Example 1 further containing PLACCEL 305 had a sufficiently low viscosity.

(2) Differential Scanning Calorimetry (DSC)

Reaction heat when each of the epoxy resin compositions obtained in Examples 1 to 4 and Comparative Examples 1 to 3 was heated on specific conditions (the following DSC measurement conditions) was measured in a sealing sample container made of aluminum (15 µl) at 25 to 200° C. on a temperature rising condition of 1° C./minute using DSC ("Model DSC6200" manufactured by Seiko Instruments Inc.). The following measured exothermic peak temperatures were shown in "DSC peak temperature" in Tables 1 and 2.

Figure 3:
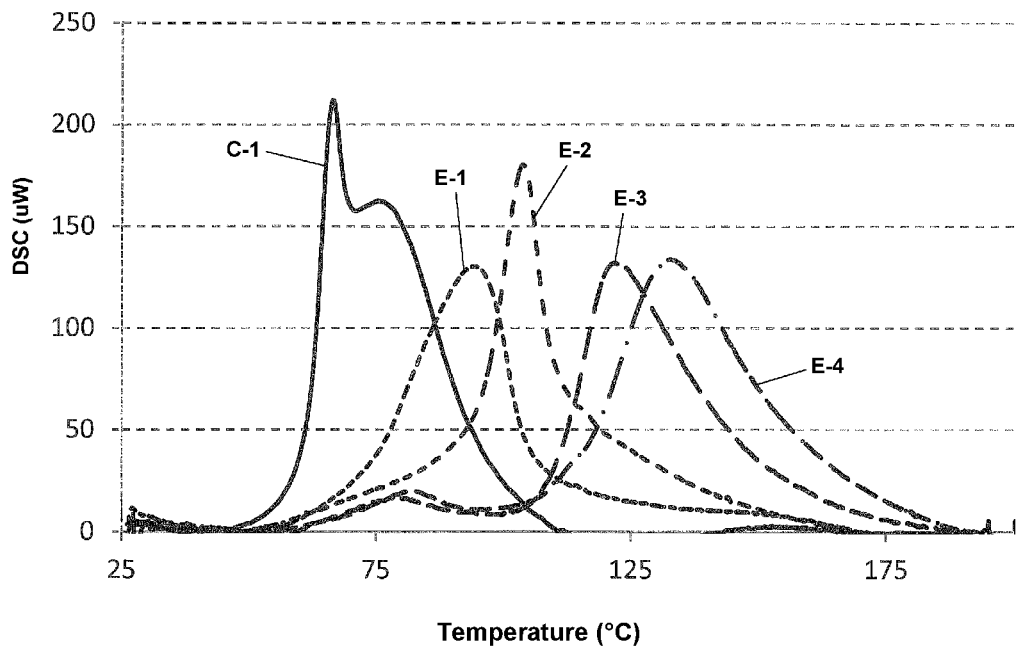
FIG. 3 is a graph showing the DSC measurement results of epoxy resin compositions obtained in Examples 1 to 4 and Comparative Example 1.

As shown in Table 1 and FIG. 3, each of the epoxy resin compositions obtained in Examples 1 to 4 had more gradual initial rise of reaction heat at low temperatures than that of the epoxy resin composition obtained in Comparative Example 1, and the initial rise was present at temperatures higher than a temperature showing the peak of heat generation (exothermic peak temperature). The exothermic peak temperature of each of the epoxy resin compositions obtained in Examples 1 to 4 tended to be increased in proportion to the amount blended of PLACCEL 305.

This suggested that the amount of addition of a polymer polyol such as PLACCEL 305 was changed according to a curing condition to allow the epoxy resin composition to be cured while suppressing a temperature increase caused by the curing reaction. E-1, E-2, E-3, E-4, and C-1 in FIG. 3 denote the results of Example 1, Example 2, Example 3, Example 4, and Comparative Example 1, respectively.

Figure 4:
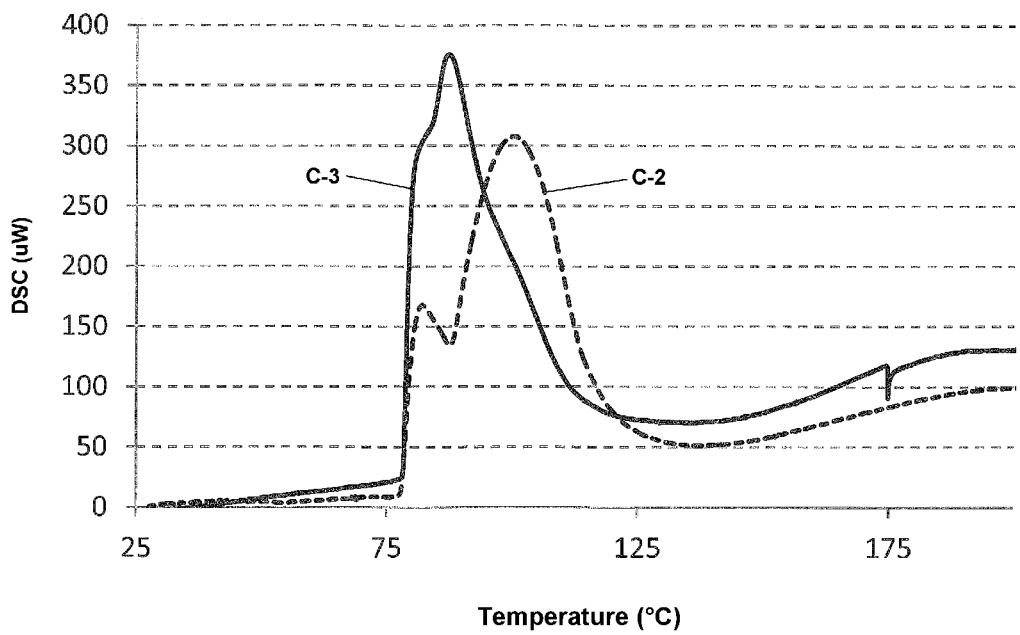
FIG. 4 is a graph showing the DSC measurement results of epoxy resin compositions obtained in Comparative Examples 2 and 3.

In contrast, each of the epoxy resin compositions obtained in Comparative Examples 2 and 3 corresponds to an epoxy resin composition containing a cationic curing catalyst (SAN-AID SI-100L) instead of a Lewis acid-amine complex (boron trifluoride-monoethylamine complex) used in Comparative Example 1 and Example 2. As shown in Table 2 and FIG. 4, in the case of these epoxy resin compositions, a large exothermic peak appeared rapidly at temperatures higher than 75° C. As shown in Table 2 and FIG. 4, the reactivity of the system containing the cationic curing catalyst when a polymer polyol such as PLACCEL 305 was blended in the system was improved contrary to the system containing the Lewis acid-amine complex, which provided a lower exothermic peak temperature. As also described in Reference Literature (Japanese Patent Laid-Open No. 2011-79910), when a compound containing a hydroxyl group such as water or a polyol is blended in an epoxy resin composition containing a cationic curing catalyst, the activity of a cationic curing catalyst is generally improved, which provides the result contrary to the object of the present invention (a decrease in heat generation associated with a curing reaction). C-2 and C-3 in FIG. 4 denote the results of Comparative Example 2 and Comparative Example 3, respectively.

(3) Highest Temperature of Resin During Curing 30 g of each of the epoxy resin compositions obtained in Examples (Examples 1, 2, 4, and 5) shown in Table 3 was placed in a container having a volume of 100 mL, and heated at 60° C. for 12 hours to measure an internal temperature of a resin in this case. The internal temperature of the resin was measured with a thermocouple thermometer inserted into the epoxy resin composition. The measured highest temperature was shown in "internal highest temperature of resin during curing" in Table 3.

In contrast, the epoxy resin composition obtained in Comparative Example 1 which did not contain PLACCEL 305 was subjected to the same test as the above as a trial. From the tendency shown in Table 1 and FIG. 3, there was a risk of runaway of the reaction and explosion or the like, the epoxy resin composition was subjected to the same test on a smaller scale (about 10 g). Because a rapid temperature increase to not less than 200° C. was observed, the test was stopped. In contrast, as shown in Table 3, in the epoxy resin compositions obtained in Examples, the heat generation associated with the curing reaction was suppressed. Even in the case of Example 5 showing the highest temperature, the highest temperature was about 180° C. Particularly, in the epoxy resin composition obtained in Example 2, the heat generation associated with the curing reaction was notably suppressed. In addition, the curing reaction also proceeded efficiently as follows.

As shown in Table 3, the internal temperature increase in the epoxy resin composition can be suppressed by increasing the amount blended of PLACCEL 305. The temperature increase in the epoxy resin composition during curing could be particularly efficiently prevented by blending PLACCEL 305 at the ratio of Example 2 or Example 4 on the curing condition.

A reaction rate (reaction rate after curing) was calculated by measuring DSC after and before each of the epoxy resin compositions was cured. The results are shown in Table 3. It was confirmed that the reaction of each of the epoxy resin compositions obtained in Example 1, Example 2, and Example 5 proceeded with high efficiency on the basis of the curing condition in this test, but the epoxy resin composition obtained in Example 4 was highly unreacted, which caused insufficient reaction proceeding. As described above, in the case of the curing condition in this test, it is found that the blending composition of the epoxy resin composition obtained in Example 2 provides the most excellent productivity of the cured product.

The highest temperature of the resin (internal highest temperature of resin during curing) when each of the epoxy resin compositions obtained in Examples 6 to 9 was cured with the resin amount thereof increased was also measured in the same manner as in the above. A container having a cylindrical shape was used as the container. In the epoxy resin compositions of Examples 8 and 9, epsilon-caprolactone (manufactured by Daicel Corporation) of the same part by weight as that of a boron trifluoride-monoethylamine was used in order to uniformly disperse the boron trifluoride-monoethylamine in the epoxy resin composition. Because heat storage in the central part of the epoxy resin composition was remarkable with the increase in the resin amount, the epoxy resin composition was subjected to primary curing at a low temperature (50° C. or 55° C.), and then subjected to secondary curing at 80° C. in Examples 8 and 9, to cure the epoxy resin composition while controlling the internal temperature of the resin. As shown in Table 4, also in the epoxy resin compositions obtained in Examples 8 and 9, it was confirmed that the increase in the resin temperature during curing was suppressed, and the heat storage in the central part of the epoxy resin composition caused by increasing the resin amount could also be controlled.

(4) Viscosity Stability when Silica is Blended

In order to evaluate viscosity stability when silica (silica filler) was blended in the epoxy resin composition of the present invention, the following test (accelerating test by heating) was carried out. Because the curing reaction proceeded during heating when the epoxy resin composition of the present invention was used as a sample of the test, a composition excluding a Lewis acid-amine salt from the epoxy resin composition of the present invention was used as the sample. A sample of test example 1 was prepared by mixing constituents shown in Table 5 while stirring the constituents at room temperature for 10 minutes using a planetary centrifugal mixer; and samples of Examples 2 to 4 were prepared by first heating and stirring constituents other than silica shown in Table 5 at 100° C. for 2 hours to mix the constituents, then cooling the mixture to room temperature, and then adding silica (the trade name "FUSELEX RD-8" manufactured by Tatsumori Ltd.) at a blending ratio shown in Table 5, followed by stirring and mixing.

The temporal change of the viscosity was measured for each of the samples (samples used for test examples 1 to 4) obtained above when being heated and stirred at 120° C. The viscosity of the sample was measured under conditions of a rotor: standard 1°34'×R24, temperature: 25° C., and the number of rotations: 20 to 0.5 rpm using a digital viscometer ("Model DVU-EII" manufactured by Tokimec, Inc.). The measurement results of the viscosities before heating at 120° C. (0 h), after heating and stirring at 120° C. for 1 hour (1 h), after heating and stirring at 120° C. for 2 hours (2 h), and after heating and stirring at 120° C. for 3 hours (3 h) were shown in Table 5.

As shown in Table 5, because the sample of test example 2 containing ADK STAB PEP-36 which is a phosphite ester compound has higher viscosity stability than that of the sample of test example 1 which does not contain ADK STAB PEP-36, the sample of test example 2 has excellent preserving property and moldability. It was confirmed that the sample of test example 3 containing PLACCEL 305 had lower viscosity stability than that of the sample of test example 1; however, it was confirmed that, even when containing PLACCEL 305, the sample of test example 4 containing ADK STAB PEP-36 had high viscosity stability as with the sample of test example 2.

From the results described above, it is appreciated that when the epoxy resin composition of the present invention contains the phosphite ester compound, the epoxy resin composition has excellent viscosity stability even if the epoxy resin composition contains the silica filler, for example.

TABLE 1

| | | | Example 1 | Example 2 | Example 3 | Example 4 | Comparative Example 1 |
|---|---|---|---|---|---|---|---|
| Epoxy resin composition | CELLOXIDE 2021P | part by weight | 95 | 90 | 80 | 70 | 100 |
| | PLACCEL 305 | part by weight | 5 | 10 | 20 | 30 | — |
| | ADK STAB PEP-36 | part by weight | 0.475 | 0.45 | 0.4 | 0.35 | 0.5 |
| | Boron trifluoride-monoethylamine | part by weight | 3 | 3 | 3 | 3 | 3 |
| DSC peak temperature | | ° C. | 94.4 | 103.7 | 121.6 | 133.5 | 66.4 |
| Viscosity (25° C.) | | mPa · s | — | 279 | — | — | 244 |

TABLE 2

| | | | Comparative Example 2 | Comparative Example 3 |
|---|---|---|---|---|
| Epoxy resin composition | CELLOXIDE 2021P | part by weight | 100 | 90 |
| | PLACCEL 305 | part by weight | — | 10 |
| | ADK STAB PEP-36 | part by weight | 0.5 | 0.45 |
| | SI-100L | part by weight | 0.6 | 0.6 |
| DSC peak temperature | | ° C. | 100.7 | 86.1 |

TABLE 3

| | | | Example 5 | Example 1 | Example 2 | Example 4 |
|---|---|---|---|---|---|---|
| Epoxy resin composition | CELLOXIDE 2021P | part by weight | 97.5 | 95 | 90 | 70 |
| | PLACCEL 305 | part by weight | 2.5 | 5 | 10 | 30 |
| | ADK STAB PEP-36 | part by weight | 0.4875 | 0.475 | 0.45 | 0.35 |
| | Boron trifluoride-monoethylamine | part by weight | 3 | 3 | 3 | 3 |
| Internal highest temperature of resin during curing | | ° C. | 182.8 | 166 | 64.5 | 60.3 |
| Reaction rate after curing | | % | 100 | 100 | 70 | 11 |

TABLE 4

|  |  |  | Example 6 | Example 7 | Example 8 | | Example 9 | |
|---|---|---|---|---|---|---|---|---|
| Epoxy resin composition | CELLOXIDE 2021P | part by weight | 90 | 90 | 90 | | 90 | |
|  | PLACCEL 305 | part by weight | 10 | 10 | 10 | | 10 | |
|  | ADK STAB PEP-36 | part by weight | 0.45 | 0.45 | 0.45 | | 0.45 | |
|  | Boron trifluoride-monoethylamine | part by weight | 2.7 | 2.7 | 2.7 | | 2.7 | |
|  | ε-caprolactone | part by weight | — | — | 2.7 | | 2.7 | |
| Resin amount |  | g | 100 | 300 | 500 | | 500 | |
| Container radius |  | mm | 30 | 40 | 55 | | 55 | |
| Curing temperature |  | ° C. | 60 | 55 | Primary curing 50 | Secondary curing 80 | Primary curing 55 | Secondary curing 80 |
| Curing time |  | h | 7 | 20 | 20 | 7 | 12 | 7 |
| Internal highest temperature of resin during curing |  | ° C. | 70.6 | 70.4 | 57.0 | 87.4 | 68.7 | 84.0 |

TABLE 5

|  |  |  | Test Example 1 | Test Example 2 | Test Example 3 | Test Example 4 |
|---|---|---|---|---|---|---|
| Epoxy composition resin | CELLOXIDE 2021P | part by weight | 100 | 100 | 90 | 90 |
|  | PLACCEL 305 | part by weight | — | — | 10 | 10 |
|  | ADK STAB PEP-36 | part by weight | — | 0.5 | — | 0.5 |
|  | FUSELEX RD-8 | part by weight | 66.7 | 66.7 | 66.7 | 66.7 |
| Viscosity change during heating at 120° C. | 0 h | mPa · s | 1677 | 943 | 20810 | 1081 |
|  | 1 h | mPa · s | 3119 | 1251 | >100000 | 1379 |
|  | 2 h | mPa · s | 3751 | 1206 | — | 1472 |
|  | 3 h | mPa · s | 4453 | 1384 | — | 1655 |

The components used in the above Examples are as follows.

CELLOXIDE 2021P: the trade name "CELLOXIDE 2021P" (3,4-epoxycyclohexylmethyl (3,4-epoxy)cyclohexanecarboxylate) manufactured by Daicel Corporation PLACCEL 305: the trade name "PLACCEL 305" (polycaprolactone triol) manufactured by Daicel Corporation ADK STAB PEP-36: the trade name "ADK STAB PEP-36" (2,6-di-t-butyl-4-methylphenyl)pentaerythritol-diphosphite) manufactured by ADEKA CORPORATION Boron trifluoride-monoethylamine: boron trifluoride-monoethylamine complex manufactured by Laborchemie Apolda GmbH SI-100L: the trade name "SAN-AID SI-100L" (cationic curing catalyst; aromatic sulfonium salt) manufactured by SANSHIN CHEMICAL INDUSTRY CO., LTD.

epsilon-caprolactone (ε-caprolactone) manufactured by Daicel Corporation

FUSELEX RD-8: the trade name "FUSELEX RD-8" (silica filler) manufactured by Tatsumori Ltd.

REFERENCE SIGNS LIST

1: container
a: hole (lower part)
b: hole (upper part)
2: syntactic foam
3: mixture of epoxy resin composition of the present invention and microballoons (dispersed product)
M: microballoons
E-1 Example 1
E-2 Example 2
E-3 Example 3
E-4 Example 4
C-1 Comparative Example 1
C-2 Comparative Example 2
C-3 Comparative Example 3

INDUSTRIAL APPLICABILITY

The epoxy resin composition of the present invention can be particularly preferably used as a resin composition for forming a syntactic foam. In addition, the epoxy resin composition of the present invention can also be used in various applications such as semiconductor devices and sealing applications of the semiconductor devices (sealing agents), adhesives, electrical insulating materials, laminates, coatings, inks, paints, sealants, resists, composite materials, transparent base materials, transparent sheets, transparent films, optical devices, optical lenses, optical members, stereolithography, electronic paper, touch panels, solar cell substrates, optical waveguides, light guide plates, and holographic memories.

The invention claimed is:

1. An epoxy resin composition comprising:
an alicyclic epoxy compound (A);
a polymer polyol having two or more terminal hydroxyl groups (B);
a Lewis acid-amine complex (C); and an antioxidant, wherein the antioxidant is a phosphite ester compound, wherein the polymer polyol (B) is at least one selected from the group consisting of a polyester polyol, a polycarbonate polyol, a polyacryl polyol, an epoxy polyol, a polyolefin polyol and a polyether ester polyol, the Lewis acid-amine complex (C) being a complex comprising a Lewis acid and at least one amine compound selected from the group consisting of a primary amine and a secondary amine, and the content of the polymer polyol (B) being 50 to 2000 parts by weight based on 100 parts by weight of the Lewis acid-amine complex (C).

2. The epoxy resin composition according to claim 1, wherein:

the phosphite ester compound is at least one selected from the group consisting of a compound represented by the following formula (I):

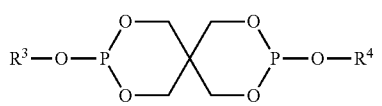

(I)

wherein R³ and R⁴ are the same or different and represent a substituted or unsubstituted hydrocarbon group, and a compound represented by the following formula (II):

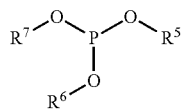

(II)

wherein R⁵, R⁶, and R⁷ are the same or different and represent a substituted or unsubstituted hydrocarbon group.

3. The epoxy resin composition according to claim 2, further comprising at least one selected from the group consisting of a silica filler and glass bubble.

4. A cured product of the epoxy resin composition according to claim 2.

5. The epoxy resin composition according to claim 1, further comprising at least one selected from the group consisting of a silica filler and glass bubble.

6. A cured product of the epoxy resin composition according to claim 1.

7. An epoxy resin composition comprising:
an alicyclic epoxy compound (A);
a polymer polyol having two or more terminal hydroxyl groups (B);
a Lewis acid-amine complex (C); and
a glass bubble,
the polymer polyol (B) being at least one selected from the group consisting of a polyester polyol, a polycarbonate polyol, a polyacryl polyol, an epoxy polyol, a polyolefin polyol, and a polyether ester polyol, the Lewis acid-amine complex (C) being a complex composed of a Lewis acid and at least one amine compound selected from the group consisting of a primary amine and a secondary amine, and the content of the polymer polyol (B) being 50 to 2000 parts by weight based on 100 parts by weight of the Lewis acid-amine complex (C), wherein the epoxy resin composition is a resin composition for forming a syntactic foam.

8. A syntactic foam comprising:
a cured product of the epoxy resin composition according to claim 7; and
glass bubbles dispersed in the cured product.

9. The epoxy resin composition according to claim 7, further comprising an antioxidant.

10. The epoxy resin composition according to claim 9, wherein
the antioxidant is a phosphite ester compound.

11. The epoxy resin composition according to claim 10, wherein
the phosphite ester compound is at least one selected from the group consisting of a compound represented by the following formula (I):

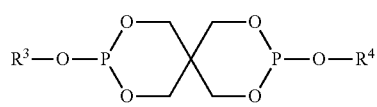

(I)

wherein R³ and R⁴ are the same or different and represent a substituted or unsubstituted hydrocarbon group, and a compound represented by the following formula (II):

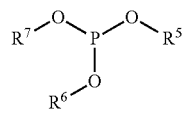

(II)

wherein R⁵, R⁶, and R⁷ are the same or different and represent a substituted or unsubstituted hydrocarbon group.

12. A syntactic foam comprising:
a cured product of the epoxy resin composition according to claim 11; and
glass bubbles dispersed in the cured product.

13. A syntactic foam comprising:
a cured product of the epoxy resin composition according to claim 10; and
glass bubbles dispersed in the cured product.

14. A syntactic foam comprising:
a cured product of the epoxy resin composition according to claim 9; and
glass bubbles dispersed in the cured product.

* * * * *